J. P. KEENEY.
TUBE CUTTER.
APPLICATION FILED MAY 14, 1913.
1,118,494.
Patented Nov. 24, 1914.
2 SHEETS—SHEET 1.
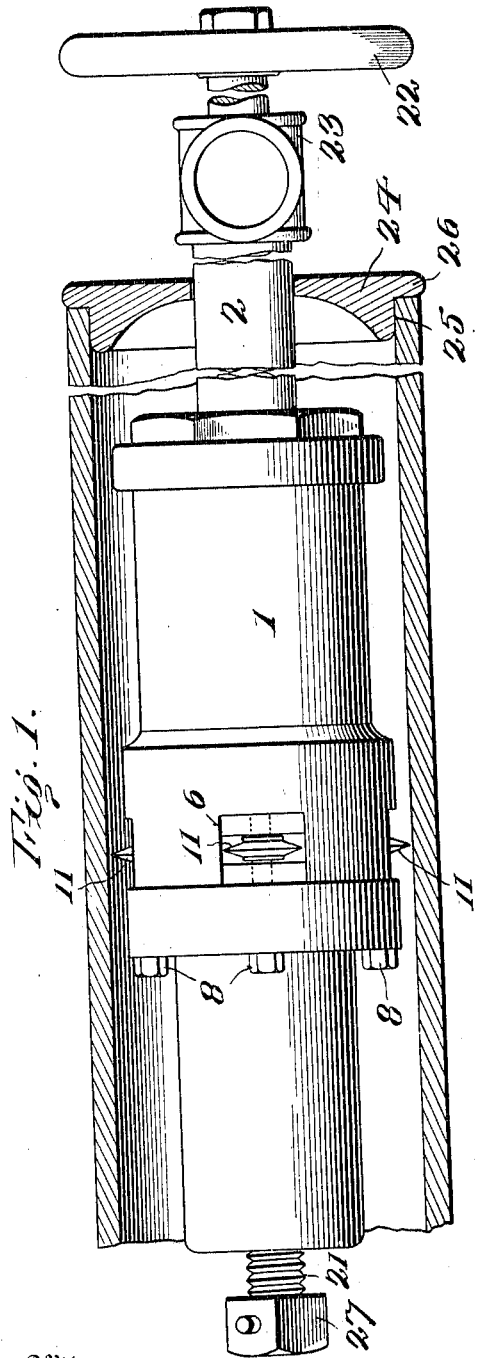
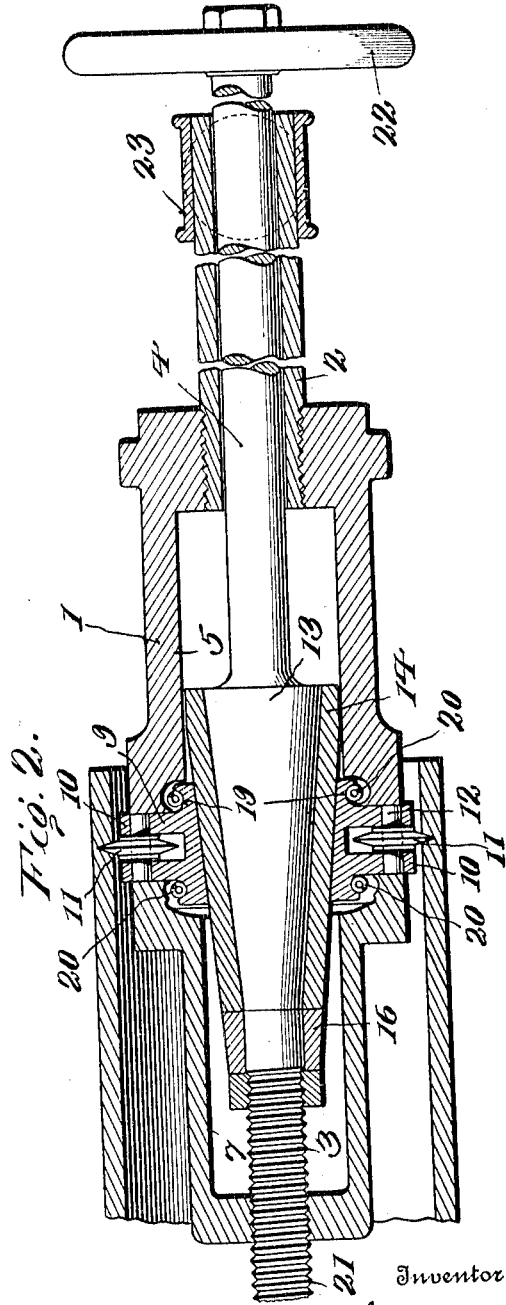
Witnesses
Inventor
Joseph P. Keeney
By Sturtevant Mason
Attorneys

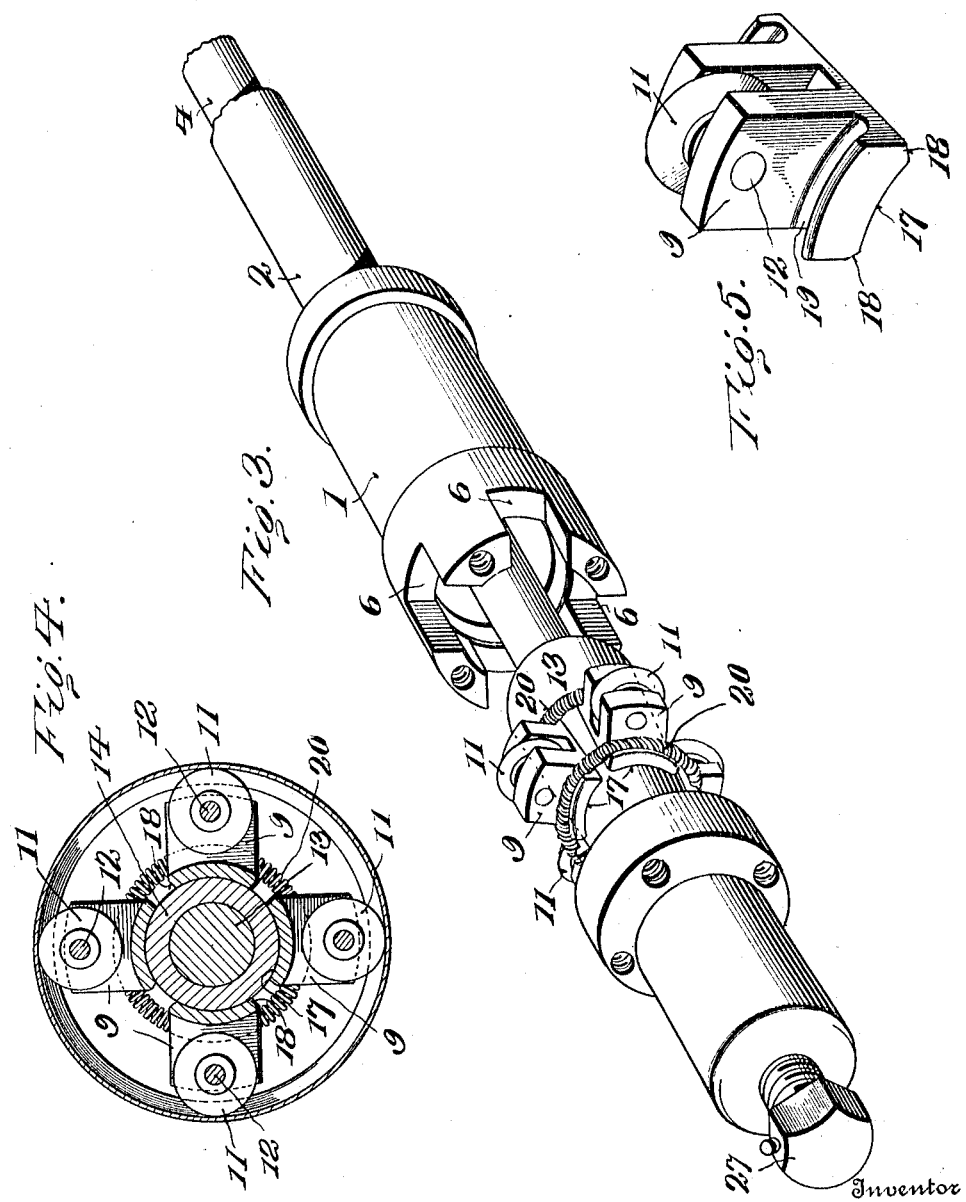

UNITED STATES PATENT OFFICE.

JOSEPH PETER KEENEY, OF NORFOLK, VIRGINIA.

TUBE-CUTTER.

1,118,494.   Specification of Letters Patent.   Patented Nov. 24, 1914.

Application filed May 14, 1913. Serial No. 767,686.

*To all whom it may concern:*

Be it known that I, JOSEPH P. KEENEY, a citizen of the United States, residing at Norfolk, in the county of Norfolk, State of Virginia, have invented certain new and useful Improvements in Tube-Cutters, of which the following is a description, reference being had to the accompanying drawing and to the figures of reference marked thereon.

The invention relates to new and useful improvements in tube cutters, and more especially to tube cutters wherein cutters engage the inner surface of the tube and are forced outwardly against the tube during the cutting action.

An object of the invention is to provide a tube cutter of the above character wherein the carriers for the cutters are radially guided in a cutter head, positively forced outwardly into contact with the tube to be cut, and yieldingly withdrawn from contact with the tube or into the cutter head when released by the expanding member.

A further object of the invention is to provide a cutter for tubes, which shall be durable in construction, and which shall be of few parts which may be readily assembled and taken apart for cleaning or repairing.

These and other objects will in part be obvious, and will in part be hereinafter more fully described.

In the drawings, which show by way of illustration one embodiment of the invention, Figure 1 is a sectional view through a tube to be cut, showing my improved cutter in side elevation; Fig. 2 is a longitudinal sectional view through the cutter head; Fig. 3 is a perspective view, with the parts of the cutter head separated to show the members within the same; Fig. 4 is a transverse sectional view through a tube, showing the carriers for the cutter, the spring for retracting the same and the means for expanding the cutters; and Fig. 5 is a detail in perspective, showing one of the cutter carriers and the rotating cutter therefor.

The invention consists generally in providing a cylindrical cutter head, in which are formed a plurality of radially extending guide ways, each of which is adapted to receive and guide a cutter-supporting carriage. In each carriage is a rotating cutter. These carriages are drawn toward the center of the cutter head by springs and are forced outwardly into contact with the tube to be cut by a cone-shaped expanding member, which is moved longitudinally of the cutter head by a feed screw.

Referring more in detail to the drawings, my improved cutter for tubes consists of a cutter head 1, into which is threaded or otherwise secured a tubular shank 2. This tubular shank is free from threads throughout its entire length, and a feed screw 3 having a stem or operating shaft 4 extends through said tubular shank 2.

This cutter head 1, as above noted, is cylindrical in form, and is made in two sections. The section 5 is formed with radially extending guideways 6, which are equally spaced, and, as herein shown, are four in number. The section 7 of the cutter head is adapted to be secured to the section 5 by suitable bolts 8, and this section 7 closes the radial guideways 6 and forms one wall of each guideway. Located within each guideway 6 is a carriage 9. Each carriage is provided with outwardly extending arms 10, between which is located a roller cutter 11. This roller cutter is carried by a supporting shaft 12, which is mounted in the arms of the carrier. The arms 10 of the carriage are formed so as to fit within the guide way 6. These carriages are adapted to move radially in the guideways, but are prevented from lateral or circular movement by the arms of the carriages contacting with the side walls of the guideway.

The feed screw 3 is formed with a cone-shaped section 13. On this cone-shaped section 13 is a hardened steel sleeve 14, the outer face of which is shaped as the frustum of a cone, and said sleeve is held on the feed screw by a suitable nut 15 and a collar 16. The carriages 9 are adapted to rest on the outer face of the hardened steel sleeve. The inner face of each carriage is curved, as at 17, (see Figs. 4 and 5), so as to conform to the outer surface of the sleeve 14. The edges of the carriage are cut away as at 18, so as to permit the sleeve to turn freely on a supporting base on the carriage. Each carriage projects laterally from the arms 10, and is formed with a groove 19 at each side of said arms. Circular coiled springs 20 are disposed in the grooves 19, and yieldingly hold the carriages pressed against the sleeve 14.

The feed screw 3 is formed with a thread 21, which engages a corresponding thread in the outer closed end of the section 7 of the cutter head. A hand wheel 22 is attached to the outer end of the stem 4 of the feed screw, and by turning this hand wheel the threaded portion 21 will cause the cone 13 to travel longitudinally of the cutter head. When the cone is moved to the left, as shown in Fig. 2, the carriages will be forced outwardly through the radial guideways therefor, and the cutters carried thereby will be caused to contact with the tube to be cut. A movement of the hand wheel in the opposite direction, will move the cone to the right, as viewed in this figure, and allow the springs 20 to retract the carriages or draw the cutters toward the center of the cutter head.

The outer end of the tubular shank 2 is formed with a suitable collar 23, which coöperates with a suitable wrench or ratchet lever, whereby the cutter head may be rotated to cut the tube.

In order to center the cutter head, so that the plane of cutting will be at right angles to the longitudinal axis of the tube, I have provided a centering collar 24. This collar is formed with a central opening which engages the shank 2 of the cutter head. Said collar is formed with a cylindrical part 25, adapted to engage the inner face of the end of the tube, and a projecting flange 26, which holds said centering collar in proper relation to the end of the tube. This centering collar maintains the shank 2 in the center of the tube, and assists in positioning the parts during the first cutting action upon the tube.

At the opposite end of the feed screw from the hand wheel 22 is a stop nut 27. This stop nut on the feed screw will prevent the feed screw from being entirely withdrawn from the cutter head and the releasing of the parts.

It is obvious that minor changes in the details of construction may be made, without departing from the spirit of the invention, as set forth in the appended claim.

Having thus described my invention, what I claim as new and desire to secure by Letters Patent, is:—

A tube cutter including in combination a cylindrical cutter head formed in sections, one of which is provided with radially spaced guideways which are closed by the other section, carriages mounted in said guideways, a feed screw having a threaded engagement with the cutter head, a hardened cone sleeve carried by the feed screw and engaging the carriages, means for detachably securing said sleeve to said feed screw whereby when said feed screw is rotated, said hardened sleeve is moved endwise of the cutter head, each of said carriages being curved to conform to said sleeve and each carriage having a lateral projection with the groove therein forming a seat for a spring, and a coiled spring located in the groove in each carriage for holding the carriages in contact with the sleeve.

In testimony whereof, I affix my signature, in the presence of two witnesses.

JOSEPH PETER KEENEY.

Witnesses:
CHARLES K. BETTS,
PERCY E. GREEN.